(12) United States Patent
Li et al.

(10) Patent No.: US 11,452,129 B2
(45) Date of Patent: *Sep. 20, 2022

(54) METHOD AND APPARATUS FOR LATENCY REDUCTION OF DEVICE TO DEVICE (D2D) MESSAGE IN A WIRELESS COMMUNICATION SYSTEM

(71) Applicant: ASUSTek Computer Inc., Taipei (TW)

(72) Inventors: Ming-Che Li, Taipei (TW); Li-Chih Tseng, Taipei (TW)

(73) Assignee: ASUSTek Computer Inc.

( * ) Notice: Subject to any disclaimer, the term of this patent is extended or adjusted under 35 U.S.C. 154(b) by 12 days.

This patent is subject to a terminal disclaimer.

(21) Appl. No.: 17/213,704

(22) Filed: Mar. 26, 2021

(65) Prior Publication Data

US 2021/0219324 A1 Jul. 15, 2021

Related U.S. Application Data

(63) Continuation of application No. 15/423,826, filed on Feb. 3, 2017, now Pat. No. 10,993,251.

(Continued)

(51) Int. Cl.
*H04W 72/12* (2009.01)
*H04W 88/02* (2009.01)

(52) U.S. Cl.
CPC ... *H04W 72/1284* (2013.01); *H04W 72/1278* (2013.01); *H04W 72/1294* (2013.01); *H04W 88/02* (2013.01)

(58) Field of Classification Search
CPC ......... H04W 72/1278; H04W 72/1284; H04W 72/1294; H04W 88/02
See application file for complete search history.

(56) References Cited

U.S. PATENT DOCUMENTS 10,993,251 B2 * 4/2021 Li ................ H04W 72/1294
2015/0271840 A1 9/2015 Tavildar et al.
(Continued)

OTHER PUBLICATIONS

Corresponding European Patent Application No. 17154609.6, Communication pursuant to Article 94(3) EPC, dated Mar. 21, 2019.
(Continued)

*Primary Examiner* — Elton Williams
(74) *Attorney, Agent, or Firm* — Cooper Legal Group LLC

(57) ABSTRACT

A method and apparatus are disclosed for latency reduction of device-to-device message in a wireless communication system. In one embodiment, the method includes the UE receiving a grant on a first interface wherein the grant indicates resource for transmitting scheduling information and resources for data transmission on a second interface. The method also includes the UE transmitting a first scheduling information on the second interface in a first specific timing interval and transmits a second scheduling information on the second interface in a second specific timing interval, wherein the timing difference between the second specific timing and the first specific timing is indicated by the grant, and wherein the first scheduling information indicates a first timing offset between the first scheduling information transmission and the data transmission, and the second scheduling information indicates a second timing offset between the second scheduling information transmission and the data transmission, and the first timing offset is different from the second timing offset.

20 Claims, 12 Drawing Sheets

Related U.S. Application Data

(60) Provisional application No. 62/291,911, filed on Feb. 5, 2016.

(56) References Cited

U.S. PATENT DOCUMENTS

| | | |
|---|---|---|
| 2015/0327288 A1 | 11/2015 | Park |
| 2016/0037512 A1 | 2/2016 | Lei |
| 2017/0280344 A1 | 9/2017 | Siomina |

OTHER PUBLICATIONS

Samsung, "Mode 1 Resource Allocation for D2D Broadcast Communication", 3GPP TSG RAN WG1 Meeting #77, R1-142112, Agenda Item 6.2.5.2.2, Document for Discussion and Decision, May 19-23, 2014, Seoul, Republic of Korea.

Ericsson, "Discussion on V2V Scheduling, Resource Pools and Resource Patterns", 3GPP TSG RAN WG1 Meeting #82bis, R1-155909, Agenda Item 7.2.8.2.1, Document for Discussion and Decision, Oct. 4-10, 2015, Malmo, Sweden.

Alcatel-Lucent Shanghai Bell, Alcatel-Lucent, "System Level Consideration and Evaluation for V2V Communication", 3GPP TSG RAN WG1, Meeting #83, R1-156978, Agenda Item 6.2.8.1.1, Document for Discussion/Decision, Nov. 15-22, 2015, Anaheim, CA.

Corresponding European Patent Application No. 17154609.6, Extended European Search Report dated Jul. 25, 2017.

* cited by examiner

| DCI format | Search Space |
|---|---|
| DCI format 5 | For PDCCH: Common and UE specific by C-RNTI<br>For EPDCCH: UE specific by C-RNTI |

FIG. 5 (PRIOR ART)

METHOD AND APPARATUS FOR LATENCY REDUCTION OF DEVICE TO DEVICE (D2D) MESSAGE IN A WIRELESS COMMUNICATION SYSTEM

CROSS-REFERENCE TO RELATED APPLICATIONS

The present Application claims priority to and is a continuation of U.S. application Ser. No. 15/423,826, filed on Feb. 3, 2017, entitled "METHOD AND APPARATUS FOR LATENCY REDUCTION OF DEVICE-TO-DEVICE (D2D) MESSAGE IN A WIRELESS COMMUNICATION SYSTEM", which claims the benefit of U.S. Provisional Patent Application Ser. No. 62/291,911 filed on Feb. 5, 2016. The entire disclosure of U.S. application Ser. No. 15/423, 826 and the entire disclosure of U.S. Provisional Patent Application Ser. No. 62/291,911 are incorporated herein in their entirety by reference.

FIELD

This disclosure generally relates to wireless communication networks, and more particularly, to a method and apparatus for latency reduction of device-to-device message in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed for latency reduction of device-to-device message in a wireless communication system. In one embodiment, the method includes the UE receiving a grant on a first interface wherein the grant indicates resource for transmitting scheduling information and resources for data transmission on a second interface. The method also includes the UE transmitting a first scheduling information on the second interface in a first specific timing interval and transmits a second scheduling information on the second interface in a second specific timing interval, wherein the timing difference between the second specific timing and the first specific timing is indicated by the grant, and wherein the first scheduling information indicates a first timing offset between the first scheduling information transmission and the data transmission, the second scheduling information indicates a second timing offset between the second scheduling information transmission and the data transmission, and the first timing offset is different from the second timing offset.

BRIEF DESCRIPTION OF THE DRAWINGS

FIG. 5 is a reproduction of Table 14.2-1 of 3GPP TS 36.213 V12.8.0.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: RP-152293, "New WI proposal: Support for V2V services based on LTE sidelink", LG Electronics, Huawei, HiSilicon, CATT, CATR; TR 22.885 V14.0.0 (2015-12), "Study on LTE support for Vehicle to Everything (V2X) services (Release 14)"; TS 36.213 V12.8.0 (2015-12), "E-UTRA: Physical layer procedures (Release 12)"; R1-156978, "System level consideration and evaluation for V2V communication", Alcatel-Lucent Shanghai Bell, Alcatel-Lucent; and 3GPP TS 36.321 V12.8.0 (2015-12), "E-UTRA: Medium Access Control (MAC) protocol specification (Release 12)". The standards and documents listed above are hereby expressly incorporated by reference in their entirety.

Figure 1:
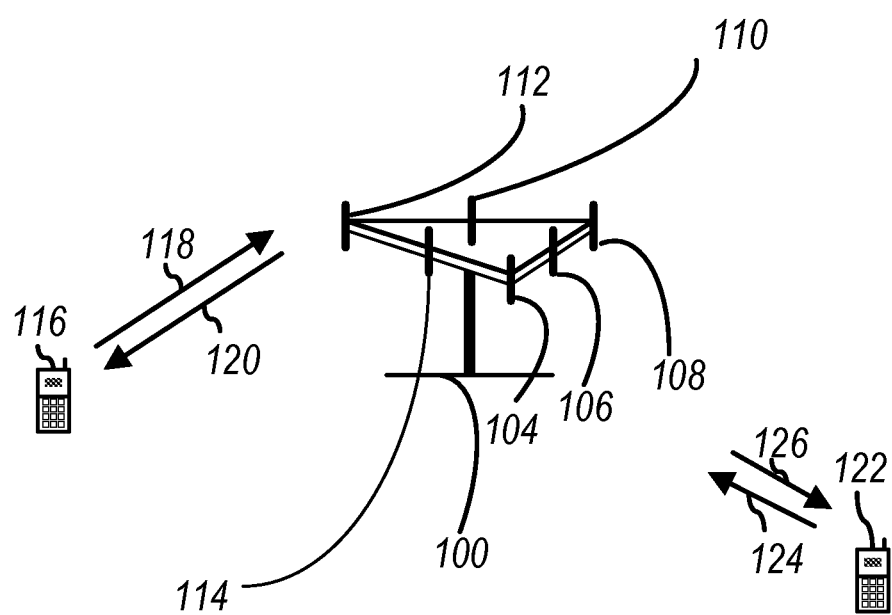
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group.

Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
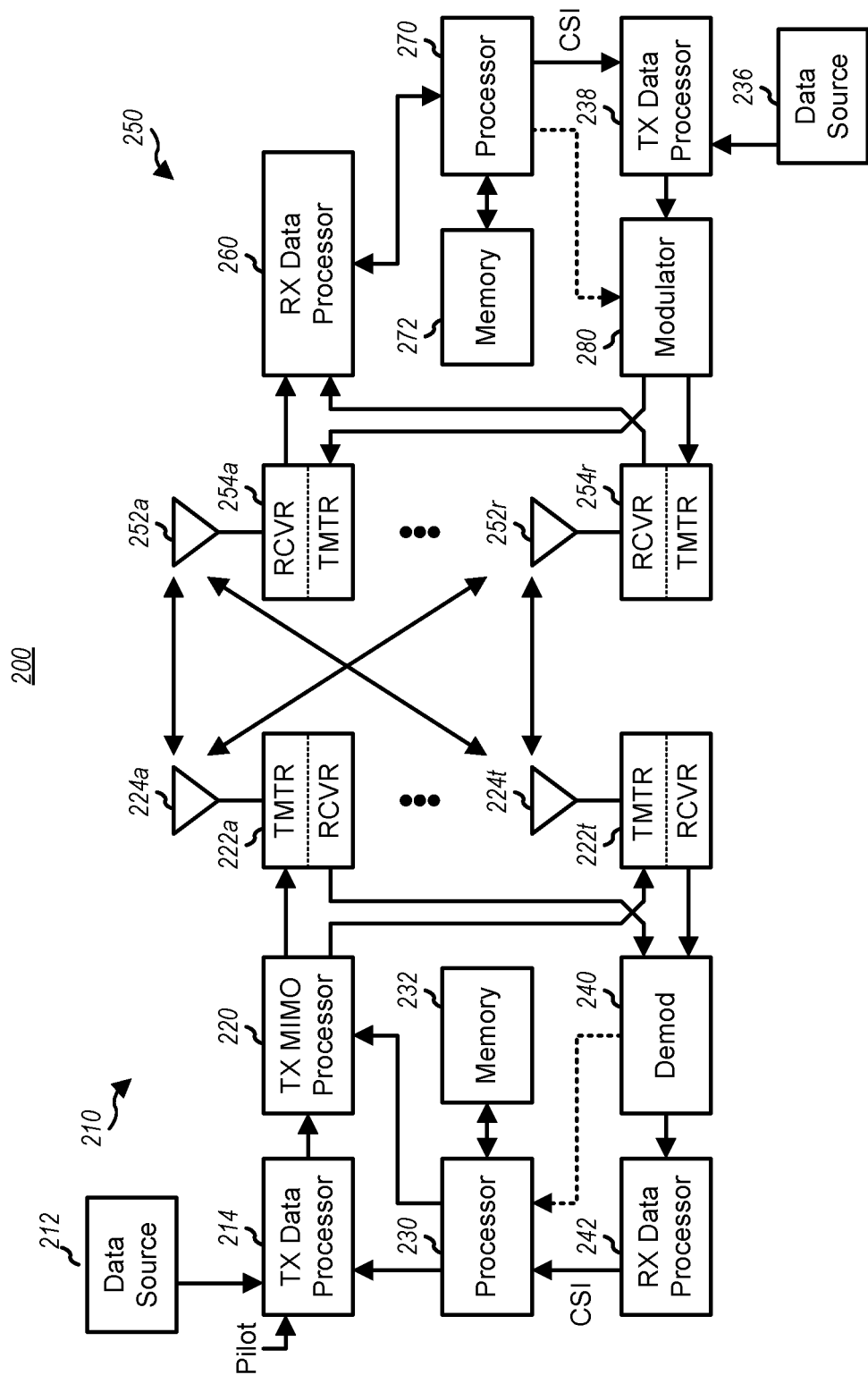
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
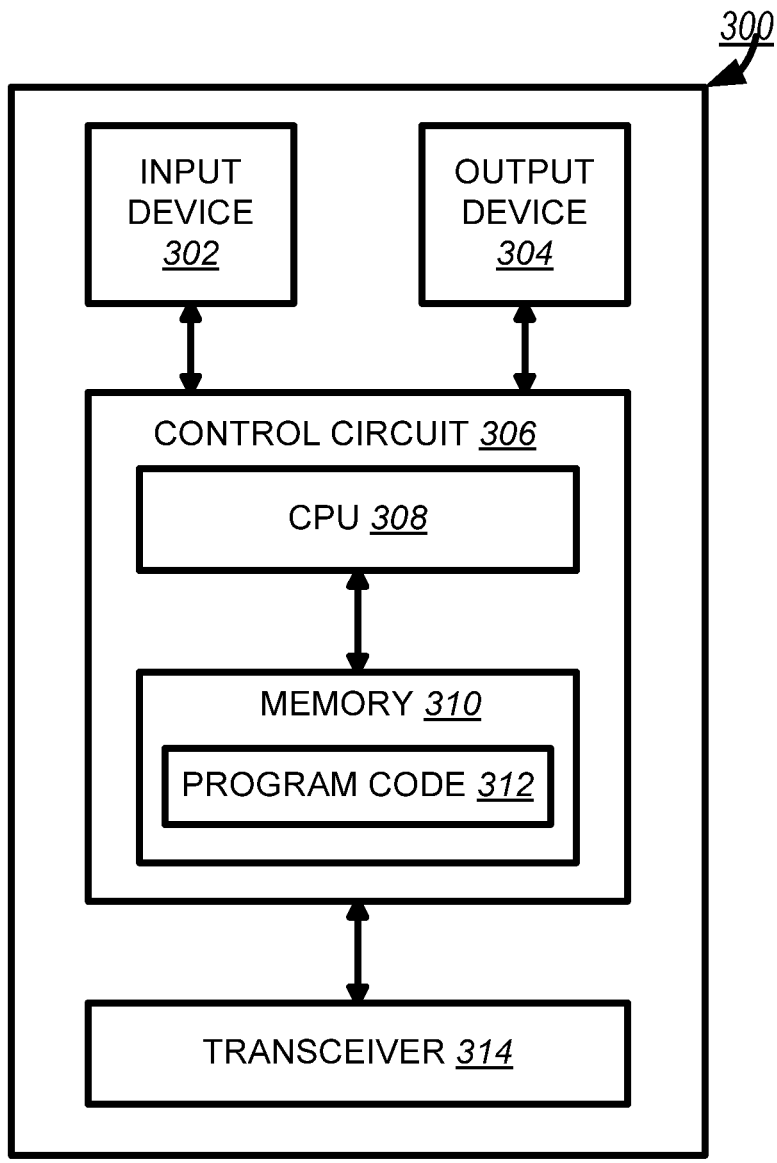
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
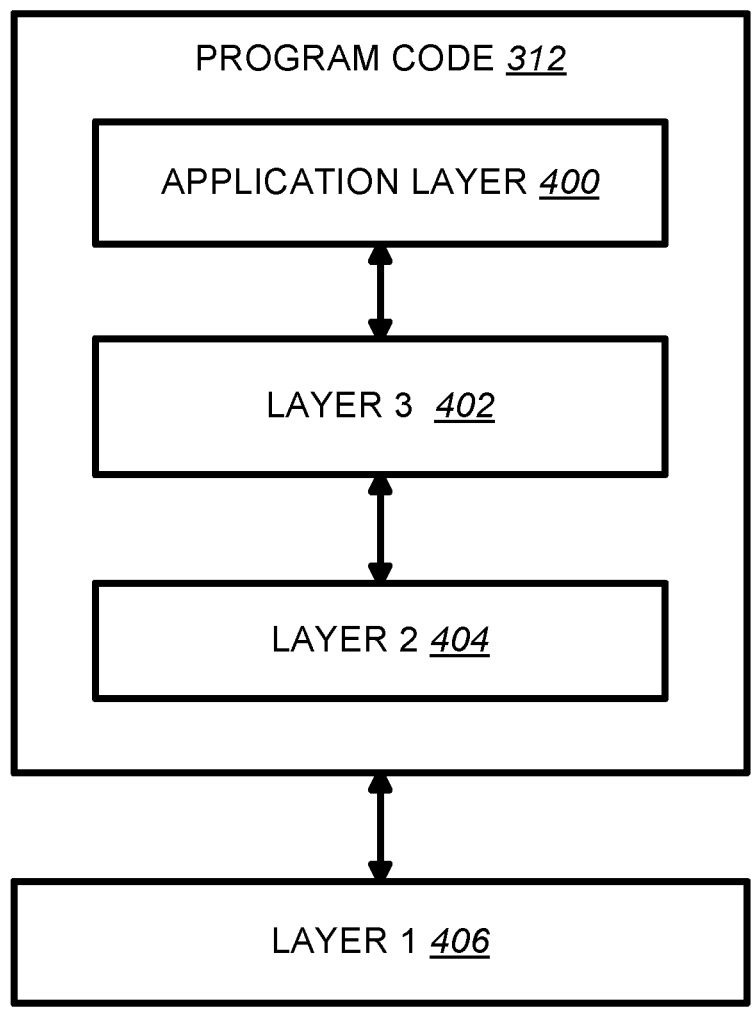
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

3GPP RP-152293 describes the work item for supporting V2V services based on LTE sidelink as follows:

3 Justification

LTE-based V2X is urgently desired from market requirement as widely deployed LTE-based network provides the opportunity for the vehicle industry to realize the concept of 'connected cars.' The market for V2V communication in particular is time sensitive because related activities such as research projects, field test, and regulatory work are already ongoing or expected to start in some countries or regions such as US, Europe, Japan, Korea, and China. In July 2015, Ministry of Industry and Information Technology (MIIT) of China approved Shanghai Intelligent Connected Vehicle Pilot Area from Shanghai International Automobile City. In October 2015, Shanghai International Automobile City released its initial plan to test 1000 LTE-V2X-enabled vehicles in an area of 90 square kilometres in 2018-2019. 3GPP is actively conducting study and specification work on LTE-based V2X in order to respond to this situation. A SA1 work item was approved in in SP-150573 to specify service requirements. SA2 agreed a study item in S2-153532 to identify and evaluate potential architecture enhancements. In RAN #68, a study item on LTE-based V2X Services was approved in RP-151109. In this study PC5-based V2V has been given highest priority until RAN #70. The motivation for prioritizing V2V until RAN #70 is to start a V2V work item in December 2015, as proposed in RP-151082. This RAN Feasibility Study (FS_LTE_V2X, TR 36.885) has completed the part of PC5 transport for V2V services. The RAN study concluded that it is feasible to support V2V services based on LTE PC5 interface with necessary enhancements, and the study also recommended to enhance at least LTE sidelink resource allocation, physical layer structure, and synchronization. In the meantime, the RAN study is also considering V2V operation scenarios based on not only LTE PC5 interface but also LTE Uu interface or a combination of Uu and PC5, and the maximum efficiency of V2V services may be achieved by selecting/switching the operation scenario properly.

Early completion of the corresponding RAN specification for PC5-based V2V and integration with Uu interface will enable fast preparation for device and network implementation, thereby allowing more chance for LTE-based V2V in the market. In addition, it can provide the basis for other V2X services, especially V2I/N and V2P services, so that RAN support for all the V2X services can be completed in time.

4. Objective

4.1 Objective of SI or Core Part WI or Testing Part WI

The objectives of this work item are to specify LTE sidelink enhancements for V2V services defied in [SA1 TR: TR 22.885]. Specification work in this item should start from the relevant outcome of the feasibility study on LTE-based V2X [RAN TR: TR 36.885].

As can be seen from TR 22.885, some V2I services have quite similar requirements as V2V in terms of packet size, transmission frequency, latency requirement etc. This work item does not preclude some V2I services be naturally supported with functionalities specified in this work item. The detailed objectives are as follows:

1) To specify enhancement to sidelink physical layer structure necessary for V2V services [RAN1]
2) To specify enhancement to sidelink synchronization procedure necessary for V2V services [RAN1, RAN2]
    a) Low priority is given to enhancements to Rel-12/13 SLSS-based synchronization.
3) To identify what are necessary sidelink resource allocation enhancement option(s) among the ones captured in TR 36.885 for V2V services and specify the identified option(s) [RAN1, RAN2]
4) To specify a solution/requirement (if needed) for coexistence of PC5-based V2V operation and legacy Uu operation with LTE in the same carrier frequency [RAN1] and in an adjacent carrier frequency [RAN4]
5) To specify a mechanism to enable E-UTRAN to select between PC5 and Uu for transport of V2V messages within network coverage, if necessary, in coordination with other working groups [RAN2]
    Note that this mechanism should be applicable to potential enhancement to Uu for V2V services, e.g., the outcome of the Uu-based V2V part in TR 36.885. Note that Uu performance enhancentment for V2V is not the scope of this WI.
6) To specify necessary radio protocols and RRC signaling to support the above features [RAN2]
7) To specify necessary radio access network protocols if necessary [RAN3]
8) To develop a mechanism to prevent V2V from using spectrum that V2V is not authorized to use [RAN2]
9) To specify UE Tx and Rx RF requirement covering operations at up to 6 GHz carrier [RAN4]
10) To specify RRM core requirement [RAN4]

The work item should cover V2V services both with and without LTE network coverage, and cover both the operating scenario where the carrier(s) is/are dedicated to V2V services and the operating scenario where the carrier(s) is/are licensed spectrum and also used for normal LTE operation. This work should consider extension to V2I/V2P. This work should also consider progress in SA WGs.

The specified enhancements should reuse the existing features of LTE as much as possible.

3GPP TR 22.885 defines V2V and some possible use cases as follows:

4.2 Vehicle-to-Vehicle (V2V)

E-UTRAN allows such UEs that are in proximity of each other to exchange V2V-related information using E-UTRA (N) when permission, authorisation and proximity criteria are fulfilled. The proximity criteria can be configured by the MNO. However, UEs supporting V2V Service can exchange such information when served by or not served by E-UTRAN which supports V2X Service.

The UE supporting V2V applications transmits application layer information (e.g. about its location, dynamics, and attributes as part of the V2V Service). The V2V payload must be flexible in order to accommodate different information contents, and the information can be transmitted periodically according to a configuration provided by the MNO.

V2V is predominantly broadcast-based; V2V includes the exchange of V2V-related application information between distinct UEs directly and/or, due to the limited direct communication range of V2V, the exchange of V2V-related application information between distinct UEs via infrastructure supporting V2X Service, e.g., RSU, application server, etc.

[ . . . ]

5.12 Pre-Crash Sensing Warning 5.12.1 Description

The pre-crash sensing warning application provides warnings to vehicles in imminent and unavoidable collision by exchanging vehicles attributes after non-avoidable crash is detected.

5.12.2 Pre-Conditions

Vehicle A and Vehicle B are supporting V2X Service and can communicate with each other using V2V service.

5.12.3 Service Flows

Vehicle A detects that a crash cannot be avoided.

Vehicle A broadcasts a message with pre-crash warning information e.g., vehicle attributes.

Vehicle B receives and processes the message and provides warnings of pre-crash to driver.

5.12.4 Post-Conditions

The driver of Vehicle B takes appropriate action.

5.12.5 Potential Requirements

The following potential requirements are derived from this use case:

Note 1: Some example informative V2V parameter sets are offered in Annex A of this document.

[PR.5.12.5-001] The E-UTRA(N) shall be able to transfer V2V Service messages between two highly mobile UEs supporting V2V Service with less than 20 ms latency and high reliability.

Note 2: This requirement might be treated with lower priority compared to the other requirements.

[PR.5.12.5-002] The E-UTRA(N) shall be able to support UEs supporting V2V Service moving in opposite directions at a maximum absolute velocity of 160 km/h.

[PR.5.12.5-003] The E-UTRA(N) shall be able to support a message size of up to [TBD] bytes.

Note 3: The content (which is out of scope of 3GPP) allows the application layer to make decisions based on vehicles attributes e.g. its current position, speed and acceleration.

3GPP TS 36.213 describes the Physical Sidelink Control Channel related procedures on LTE sidelink as follows:

14.2 Physical Sidelink Control Channel Related Procedures

For sidelink transmission mode 1, if a UE is configured by higher layers to receive DCI format 5 with the CRC scrambled by the SL-RNTI, the UE shall decode the PDCCH/EPDCCH according to the combination defined in Table 14.2-1.

Table 14.2-1 of 3GPP TS 36.213 V12.8.0 is Reproduced as FIG. 5

14.2.1 UE Procedure for Transmitting the PSCCH

For sidelink transmission mode 1 and PSCCH period i, the UE shall determine the subframes and resource blocks for transmitting SCI format 0 as follows.

SCI format 0 is transmitted in two subframes in the subframe pool and one physical resource block per slot in each of the two subframes, wherein the physical resource blocks belong to the resource block pool, where the subframe pool and the resource block pool are indicated by the PSCCH resource configuration (as defined in subclause 14.2.3)

the two subframes and the resource blocks are determined using "Resource for PSCCH" field ($n_{PSCCH}$) in the configured sidelink grant (described in [8]) as described in subclause 14.2.1.1.

the UE shall set the contents of the SCI format 0 as follows:

the UE shall set the Modulation and coding scheme field according to the Modulation and coding scheme indicated by the higher layer parameter mcs-r12 if the parameter is configured by higher layers.

the UE shall set the Frequency hopping flag according to the "Frequency hopping flag" field in the configured sidelink grant.

the UE shall set the Resource block assignment and hopping resource allocation according to the "Resource block assignment and hopping resource allocation" field in the configured sidelink grant.

the UE shall set the Time resource pattern according to the "Time resource pattern" field in the configured sidelink grant.

the UE shall set the eleven-bit Timing advance indication to $I_{TAF}=\lfloor N_{TA}/16 \rfloor$ to indicate sidelink reception timing adjustment value using the $N_{TA}$ (defined in [3]) value for the UE in the subframe that is no earlier than subframe $I_{b1}^{PSCCH}-4(I_{b1}^{PSCCH}$ described in subclause 14.2.1.1).

For sidelink transmission mode 2,

SCI format 0 is transmitted in two subframes in the subframe pool and one physical resource block per slot in each of the two subframes, wherein the physical resource blocks belongs to the resource block pool, where the subframe pool and the resource block pool are indicated by the PSCCH resource configuration (as defined in subclause 14.2.3)

the two subframes and the resource blocks are determined using the procedure described in subclause 14.2.1.2 the UE shall set the eleven-bit Timing advance indication 4, in the SCI format 0 to zero.

14.2.1.1 UE Procedure for Determining Subframes and Resource Blocks for Transmitting PSCCH for Sidelink Transmission Mode 1

For $0 \leq n_{PSCCH} < \lfloor M_{RB}^{PSCCH\_RP}/2 \rfloor \cdot L_{PSCCH}$, one transmission of the PSCCH is in resource block $m_{a1}^{PSCCH}$ of subframe $l_{b1}^{PSCCH}$ of the PSCCH period, where $a1=\lfloor n_{PSCCH}/L_{PSCCH} \rfloor$ and $b1=n_{PSCCH} \bmod L_{PSCCH}$.

the other transmission of the PSCCH is in resource block $m_{a2}^{PSCCH}$ of subframe $l_{b2}^{PSCCH}$ of the PSCCH period, where $a2=\lfloor n_{PSCCH}/L_{PSCCH} \rfloor + \lfloor M_{RB}^{PSCCH\_RP}/2 \rfloor$ and $b2=(n_{PSCCH}+1+\lfloor n_{PSCCH}/L_{PSCCH} \rfloor \bmod(L_{PSCCH}-1)) \bmod L_{PSCCH}$.

where $(l_0^{PSCCH}, l_1^{PSCCH}, \ldots, l_{L_{PSCCH}-1}^{PSCCH})$, $(m_0^{PSCCH}, m_1^{PSCCH}, \ldots, m_{M_{RB}^{PSCCH\_RP}-1}^{PSCCH})$, $L_{PSCCH}$ and $M_{RB}^{PSCCH\_RP}$ are described in subclause 14.2.3.

14.2.1.2 UE Procedure for Determining Subframes and Resource Blocks for Transmitting PSCCH for Sidelink Transmission Mode 2

The allowed values for PSCCH resource selection are given by $0, 1 \ldots (\lfloor M_{RB}^{PSCCH\_RP}/2 \rfloor \cdot L_{PSCCH}-1)$ where $L_{PSCCH}$ and $M_{RB}^{PSCCH\_RP}$ described in subclause 14.2.3. The two subframes and the resource blocks are determined using selected resource value $n_{PSCCH}$ (described in [8]) and the procedure described in subclause 14.2.1.1.

14.2.1.3 UE Procedure for PSCCH Power Control

For sidelink transmission mode 1 and PSCCH period i, the UE transmit power $P_{PSCCH}$ is given by the following if the TPC command field in the configured sidelink grant (described in [8]) for PSCCH period i is set to 0

$$P_{PSCCH} = P_{CMAX,PSCCH}$$

if the TPC command field in the configured sidelink grant (described in [8]) for PSCCH period i is set to 1

$$P_{PSCCH} = \min\{P_{CMAX,PSCCH}, 10 \log_{10}(M_{PSCCH}) + P_{O\_PSCCH,1} + \alpha_{PSCCH,1} \cdot PL\} \text{ [dBm]}$$

where $P_{CMAX,PSCCH}$ is defined in [6], and $M_{PSCCH}=1$ and $PL=PL_c$ where $PL_c$ is defined in subclause 5.1.1.1. $P_{O\_PSCCH,1}$ and $\alpha_{PSCCH,1}$ are provided by higher layer parameters p0-r12 and alpha-r12, respectively and are associated with the corresponding PSCCH resource configuration.

For sidelink transmission mode 2, the UE transmit power $P_{PSCCH}$ is given by $$P_{PSCCH} = \min\{P_{CMAX,PSCCH}, 10 \log_{10}(M_{PSCCH}) + P_{O\_PSCCH,2} + \alpha_{PSCCH,2} \cdot PL\} \text{ [dBm]}$$

where $P_{CMAX,PSCCH}$ is the $P_{CMAX,c}$ configured by higher layers and $M_{PSCCH}=1$ and $PL=PL_c$ where $PL_c$ is defined in subclause 5.1.1.1. $P_{O\_PSCCH,2}$ and $\alpha_{PSCCH,2}$ are provided by higher layer parameters p0-r12 and alpha-r12, respectively and are associated with the corresponding PSCCH resource configuration.

14.2.2 UE Procedure for Receiving the PSCCH

For each PSCCH resource configuration associated with sidelink transmission mode 1, a UE configured by higher layers to detect SCI format 0 on PSCCH shall attempt to decode the PSCCH according to the PSCCH resource configuration, and using the Group destination IDs indicated by higher layers.

For each PSCCH resource configuration associated with sidelink transmission mode 2, a UE configured by higher layers to detect SCI format 0 on PSCCH shall attempt to decode the PSCCH according to the PSCCH resource configuration, and using the Group destination IDs indicated by higher layers.

14.2.3 UE Procedure for Determining Resource Block Pool and Subframe Pool for PSCCH A PSCCH resource configuration for transmission/reception is associated with a set of periodically occurring time-domain periods (known as PSCCH periods). The i-th PSCCH period begins at subframe with subframe index $j_{begin} = O + i \cdot P$ and ends in subframe with subframe index $j_{end} = O + (i+1) \cdot P - 1$, where $0 \leq j_{begin}, j_{end} < 10240$, the subframe index is relative to subframe #0 of the radio frame corresponding to SFN 0 of the serving cell or DFN 0 (described in [11]), O is the offsetIndicator-r12 indicated by the PSCCH resource configuration, P is the sc-Period-r12 indicated by the PSCCH resource configuration.

For a PSCCH period, the UE determines a PSCCH pool consisting of a subframe pool and a resource block pool as follows.

For TDD, if the parameter tdd-Config-r12 is indicated by the PSCCH resource configuration, the TDD UL/DL configuration used for determining the subframe pool is given by the parameter tdd-Config-r12, otherwise, the TDD UL/DL configuration used for determining the subframe pool is given by the UL/DL configuration (i.e. parameter subframeAssignment) for the serving cell.

The first N' uplink subframes are denoted by $(l_0, l_1, \ldots l_{N'-1})$ arranged in increasing order of subframe index, where N' is the length of the bitmap subframeBitmap-r12 indicated by the PSCCH resource configuration. A subframe $l_j$ ($0 \leq j < N'$) belongs to the subframe pool if $a_j = 1$, where $(a_0, a_1, a_2, \ldots, a_{N-1})$ is the bitmap subframeBitmap-r12 indicated by the PSCCH resource configuration. The subframes in the subframe pool are denoted by $(l_0^{PSCCH}, l_1^{PSCCH}, \ldots, l_{L_{PSCCH}-1}^{PSCCH})$ arranged in increasing order of subframe index and $L_{PSCCH}$ is the number of subframes in the subframe pool. A PRB with index q ($0 \leq q < N_{RB}^{SL}$) belongs to the resource block pool if $S1 \leq q < S1+M$ or if $S2-M < q \leq S2$, where S1, S2, and M denote the prb-Start-r12, prb-End-r12 and prb-Num-r12 indicated by the PSCCH resource configuration respectively.

The resource blocks in the resource block pool are denoted by $(m_0^{PSCCH}, m_1^{PSCCH}, \ldots, m_{M_{RB}^{PSCCH\_RB}-1}^{PSCCH})$ arranged in increasing order of resource block indices and $M_{RB}^{PSCCH\_RP}$ is the number of resource blocks in the resource block pool.

3GPP TS 36.321 describes the LTE sidelink on MAC as follows:

3.1 Definitions

[ . . . ]

SC Period: Sidelink Control period, the time period consisting of transmission of SCI and its corresponding data.

SCI: The Sidelink Control Information contains the sidelink scheduling information such as resource block assignment, modulation and coding scheme and Group Destination ID [5].

[ . . . ]

Sidelink: UE to UE interface for sidelink communication and sidelink discovery. The sidelink corresponds to the PC5 interface as defined in [13].

Sidelink Discovery Gap for Reception: Time period during which the UE does not receive any channels in DL from any serving cell, except during random access procedure.

Sidelink Discovery Gap for Transmission: Time period during which the UE prioritizes transmission of Sidelink discovery over transmission of channels in UL, if they occur in the same subframe, except during random access procedure.

4.2.1 MAC Entities

E-UTRA defines two MAC entities; one in the UE and one in the E-UTRAN. These MAC entities handle the following transport channels:

[ . . . ]

Sidelink Broadcast Channel (SL-BCH);
Sidelink Discovery Channel (SL-DCH);
Sidelink Shared Channel (SL-SCH).

5.10 Semi-Persistent Scheduling

When Semi-Persistent Scheduling is enabled by RRC, the following information is provided [8]:
Semi-Persistent Scheduling C-RNTI;
Uplink Semi-Persistent Scheduling interval semiPersistSchedIntervalUL and number of empty transmissions before implicit release implicitReleaseAfter, if Semi-Persistent Scheduling is enabled for the uplink;
Whether twoIntervalsConfig is enabled or disabled for uplink, only for TDD;
Downlink Semi-Persistent Scheduling interval semiPersistSchedIntervalDL and number of configured HARQ processes for Semi-Persistent Scheduling numberOfConfSPS-Processes, if Semi-Persistent Scheduling is enabled for the downlink;
When Semi-Persistent Scheduling for uplink or downlink is disabled by RRC, the corresponding configured grant or configured assignment shall be discarded.
Semi-Persistent Scheduling is supported on the SpCell only. Semi-Persistent Scheduling is not supported for RN communication with the E-UTRAN in combination with an RN subframe configuration.
   NOTE: When eIMTA is configured for the SpCell, if a configured uplink grant or a configured downlink assignment occurs on a subframe that can be reconfigured through eIMTA L1 signalling, then the UE behaviour is left unspecified.

5.14 SL-SCH Data Transfer 5.14.1 SL-SCH Data Transmission
5.14.1.1 SL Grant Reception and SCI Transmission
In order to transmit on the SL-SCH the MAC entity must have at least one sidelink grant. Sidelink grants are selected as follows:
   if the MAC entity is configured to receive a single sidelink grant dynamically on the PDCCH and more data is available in STCH than can be transmitted in the current SC period, the MAC entity shall:
      using the received sidelink grant determine the set of subframes in which transmission of SCI and transmission of first transport block occur according to subclause 14.2.1 of [2];
      consider the received sidelink grant to be a configured sidelink grant occurring in those subframes starting at the beginning of the first available SC Period which starts at least 4 subframes after the subframe in which the sidelink grant was received, overwriting a previously configured sidelink grant occurring in the same SC period, if available;
      clear the configured sidelink grant at the end of the corresponding SC Period;
   else, if the MAC entity is configured by upper layers to receive multiple sidelink grants dynamically on the PDCCH and more data is available in STCH than can be transmitted in the current SC period, the MAC entity shall for each received sidelink grant:
      using the received sidelink grant determine the set of subframes in which transmission of SCI and transmission of first transport block occur according to subclause 14.2.1 of [2];
      consider the received sidelink grant to be a configured sidelink grant occurring in those subframes starting at the beginning of the first available SC Period which starts at least 4 subframes after the subframe in which the sidelink grant was received, overwriting a previously configured sidelink grant received in the same subframe number but in a different radio frame as this configured sidelink grant occurring in the same SC period, if available;
      clear the configured sidelink grant at the end of the corresponding SC Period;
   else, if the MAC entity is configured by upper layers to transmit using one or multiple pool(s) of resources as indicated in subclause 5.10.4 of [8] and more data is available in STCH than can be transmitted in the current SC period, the MAC entity shall for each sidelink grant to be selected:
[ . . . ]
   NOTE: Retransmissions on SL-SCH cannot occur after the configured sidelink grant has been cleared.
   NOTE: If the MAC entity is configured by upper layers to transmit using one or multiple pool(s) of resources as indicated in subclause 5.10.4 of [8], it is left for UE implementation how many sidelink grants to select within one SC period taking the number of sidelink processes into account.
The MAC entity shall for each subframe:
   if the MAC entity has a configured sidelink grant occurring in this subframe:
      if the configured sidelink grant corresponds to transmission of SCI:
         instruct the physical layer to transmit SCI corresponding to the configured sidelink grant.
      else if the configured sidelink grant corresponds to transmission of first transport block:
         deliver the configured sidelink grant and the associated HARQ information to the Sidelink HARQ Entity for this subframe.
      NOTE: If the MAC entity has multiple configured grants occurring in one subframe and if not all of them can be processed due to the single-cluster SC-FDM restriction, it is left for UE implementation which one of these to process according to the procedure above.
5.14.2 SL-SCH Data Reception
5.14.2.1 SCI Reception
SCI transmitted on the PSCCH indicate if there is a transmission on SL-SCH and provide the relevant HARQ information.
The MAC entity shall:
   for each subframe during which the MAC entity monitors PSCCH:
      if SCI for this subframe has been received on the PSCCH with a Group Destination ID of interest to this MAC entity:
         determine the set of subframes in which reception of the first transport blocks occur according to subclause 14.2.2 of [2] using the received SCI;
         store the SCI and associated HARQ information as SCI valid for the subframes corresponding to first transmission of each transport block;
   for each subframe for which the MAC entity has a valid SCI:
      deliver the SCI and the associated HARQ information to the Sidelink HARQ Entity.
3GPP R1-156978 generally describes the frame structure for latency reduction, especially considering for urgent messages, as follows:
Latency Reduction for Urgent Messages
The most strict latency requirement for V2X is 20 ms for the case of pre-crash warning. The frame structure in FIG. 1 can't meet this requirement.

For latency reduction for urgent messages, separate SA resource pools are allocated for V2V messages of different latency requirements. As shown in FIG. 5, for periodic messages with 100 ms latency requirement, SA resource pool 1 and data resource pool 1 are allocated, which are TDMed. Data pool 1 follows SA pool 1 in time domain. For urgent messages with 20 ms latency requirement, SA resource pool 2 and data resource pool 2 are allocated, which are FDMed. FDM between SA pool 2 and data pool 2 increases occurrence frequency of SA resources in time domain to reduce SA transmission latency. Data pool 1 and data pool 2 are identical. They share the same resources to accommodate dynamic traffic efficiently.

Figure 6:
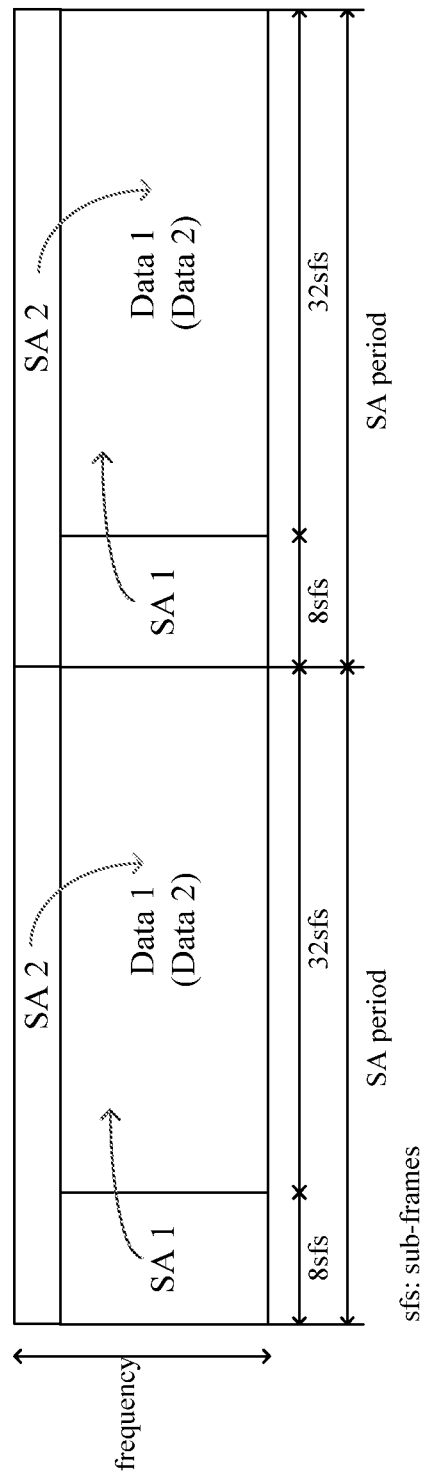
FIG. 6 is a reproduction of FIG. 5 of 3GPP R1-156978.

FIG. 5 of 3GPP R1-156978 is Reproduced as FIG. 6

From a UE Perspective, PSSCH Transmissions in Data Pool 2 Follow PSCCH Transmissions in SA Pool 2. After a UE with Urgent Message Finishes Transmitting PSCCHs, it Uses the Next Available Sub-Frames for PSSCH Transmissions.

For urgent messages with 20 ms latency requirement, an alternative scheme is that multiple SA resource pools with short duration are allocated sequentially, e.g. 4 SA pools (SA pool 2 to SA pool 5) in FIG. 6. The same number of data resource pools is allocated accordingly. Each data pool follows its corresponding SA pool in time domain. For periodic messages, data pool 1 is allocated, which comprises all data pools for urgent messages (e.g. data pool 3/4/5/2). Hence periodic messages and urgent messages share the same data resources to accommodate dynamic traffic efficiently.

To further reduce latency for urgent messages, SA pool 1 can be divided in to multiple parts, e.g. two parts in FIG. 6, spread in time domain. Accordingly, data pool 1 is divided into multiple parts. The associated cost is the slightly increased latency for periodical messages. However, the 100 ms latency can still be met. For example in FIG. 6, the worst latency increases from 80 ms (in FIG. 1) to 100 ms.

Figure 7:
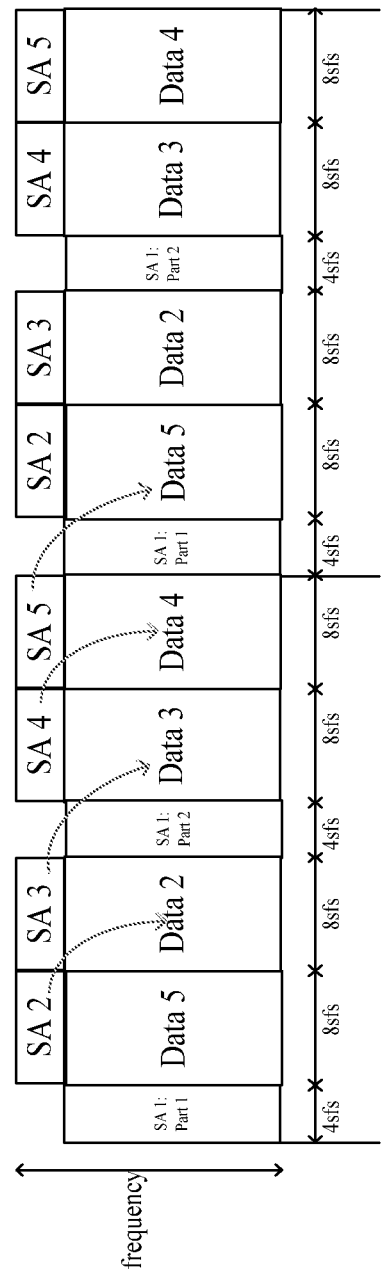
FIG. 7 is a reproduction of FIG. 6 of 3GPP R1-156978.

FIG. 6 of 3GPP R1-156978 is Reproduced as FIG. 7

To improve system level performance, multiple PSSCH transmissions (e.g. 2 transmissions in FIG. 7) can be configured for a data MAC PDU. Considering urgent messages and periodic messages share the same data resources, the time domain patterns of short span are reserved for PSSCH transmissions of urgent messages.

Further, to improve the reliability for transmissions of urgent messages, a UE with periodic messages may mute its transmissions at sub-frames used by PSSCHs of urgent messages. It can reduce collisions or in-band emission interference to PSSCHs of urgent messages.

Figure 8:
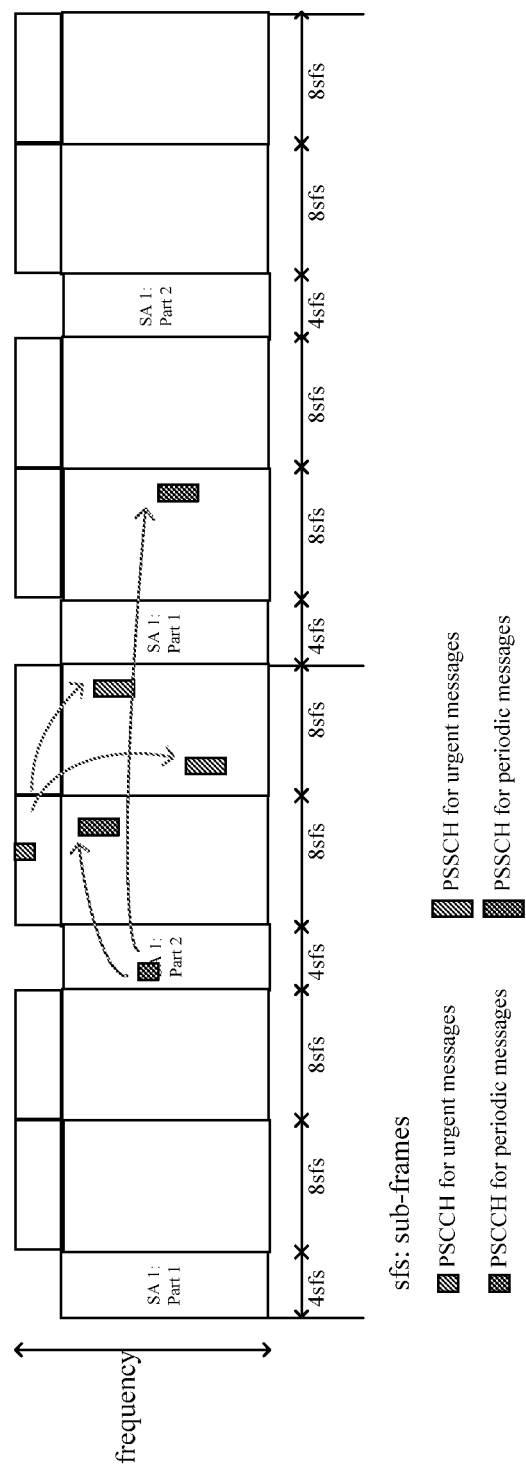
FIG. 8 is a reproduction of FIG. 7 of 3GPP R1-156978.

FIG. 7 of 3GPP R1-156978 is Reproduced as FIG. 8

Proposal 4: Consider FDM Between SA and Data Resource Pools to Meet 20 ms Latency Requirement.
Proposal 5: Consider the Frame Structure in FIG. 6 to Meet 20 ms Latency Requirement.

The strictest latency requirement for V2X is 20 ms for the case of pre-crash warning. The frame structure in D2D cannot meet this requirement. To reduce the latency of V2V (Vehicle-to-Vehicle) message transmission, there are some proposals, for instances shortening SC period, multiplexing SA pool with data pool in frequency domain. FIG. 7 is an exemplary frame structure design for latency reduction provided in 3GPP R1-156978. However, with the constraint of SA pool, the required time from receiving a SL grant and transmitting an urgent message would be at least $(4+L_{SA}+T_{data})$ ms, wherein 4 ms is assumed for a SL grant before the starting of the associated SA pool, $L_{SA}$ is the time length of a SA pool, and $T_{data}$ is the time of the first data transmission after the end of the SA pool beforehand. If the time for requesting SL grant is also considered, the latency would become longer.

Figure 9:
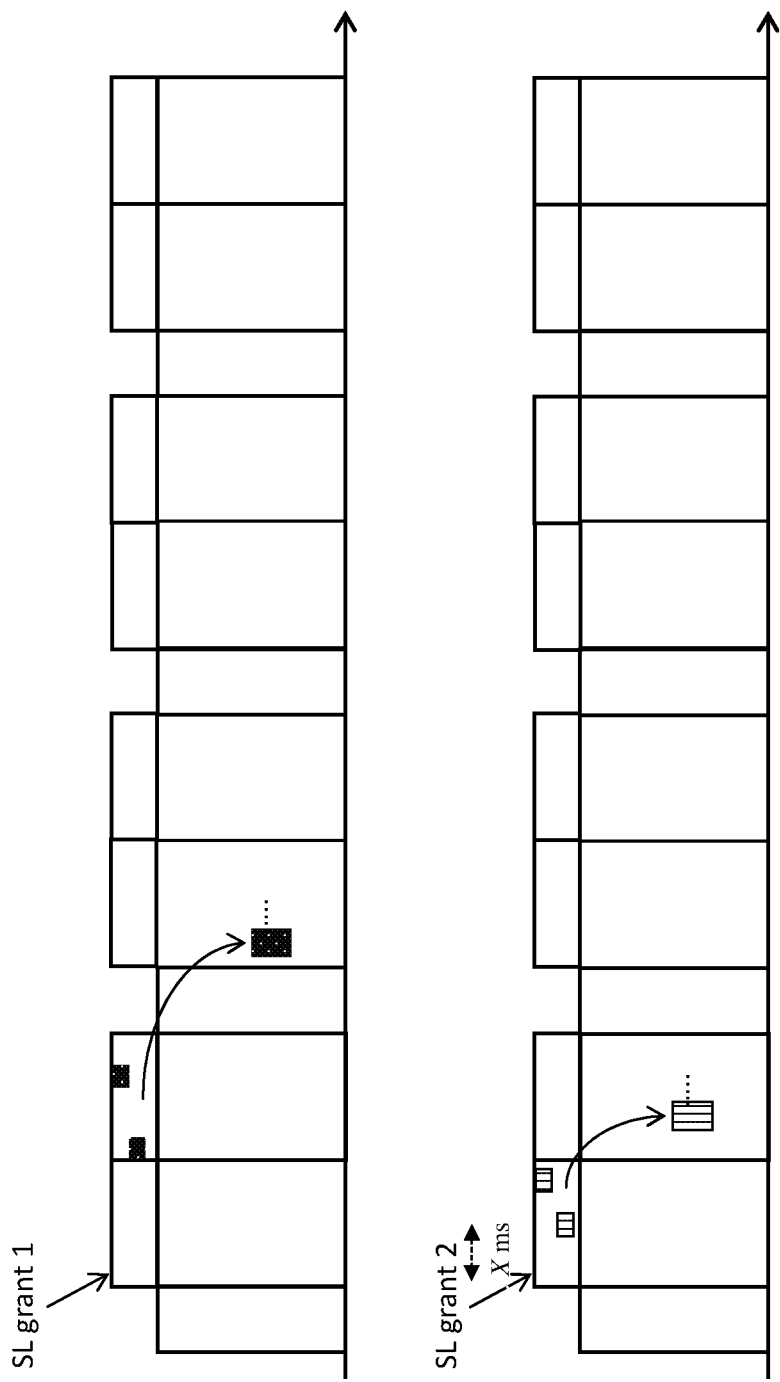
FIG. 9 is a diagram according to one exemplary embodiment.

In one embodiment, to further reduce the latency, fixed timing between SL grant and associated SA transmission could be applied. The UE does not require waiting for next SA pool after receiving SL grant. The fixed timing may be specified or configured. As an example shown in FIG. 9, the SA transmission upon receiving SL grant 1 in the upper figure follows the constraint of SA pool, and the SA transmission upon receiving SL grant 2 in the lower figure follows fixed timing, X ms. In comparison, the SA transmission associated to SL grant 2 can be transmitted faster than the SA transmission associated to SL grant1 (in the casewhere SL grant 1 and SL grant 2 are considered to have been received at the same time). The reduced latency is around $0\sim L_{SA}$ ms depending on the timing when the SL grant was received.

Assuming SA repetition is required for reliability, the UE transmits at least a first SA transmission, and a second SA transmission for a received SL grant. Fixed timing may be applied between the SL grant and the associated first SA transmission. For the timing occasion of the second SA transmission, there are some alternatives as follows:

1. Alternative 1—Based on the timing occasion of the first SA (Scheduling Assignment) transmission, apply specific formula to derive the timing occasion of the second SA transmission within the same SA pool, which is generally similar to the current D2D processing. Furthermore, the first SA transmission has the same content as the second SA transmission. For this alternative, there may or may not be a data pool division in the time domain.

2. Alternative 2—A fixed timing is applied between the timing occasion of the first SA transmission and the second SA transmission. For instance, the timing occasion of the second SA transmission is the next one subframe after the timing occasion of the first SA transmission. Furthermore, the first SA transmission has the same content as the second SA transmission. To help the receiver to distinguish between the first SA transmission and the second SA transmission, the timing occasion of the first SA transmission can be fixed at even-index or odd-index subframe. In one embodiment, the first SA transmission could utilize different DMRS from the second SA transmission. More specifically, the different DMRS means difference phases of a reference sequence. In one embodiment, the first SA transmission and the second SA transmission could be transmitted in different frequency resource pools. The frequency resource pools are configured or specified. For this alternative, there is no SA pool division in time domain, at least for the SA resources multiplexed with data resources in frequency domain. Furthermore, there may or may not be a data pool division in the time domain.

3. Alternative 3—The SL grant indicates the timing difference between the timing occasion of the first SA transmission and the second SA transmission. The first SA transmission has the different content as the second SA transmission since the receiver side does not know the timing difference beforehand. However, the first SA and the second SA indicate the same resources for data transmission. For instance, the first SA indicates a first timing offset between the first SA and the first data transmission, and the second SA indicates a second timing offset between the second SA and the first data transmission. More specifically, the second timing offset can be zero. For this alternative, there is no SA pool division in time domain, at least for the SA resources multiplexed with data resources in frequency domain. Furthermore, there may or may not be a data pool division in the time domain.

Figure 10:
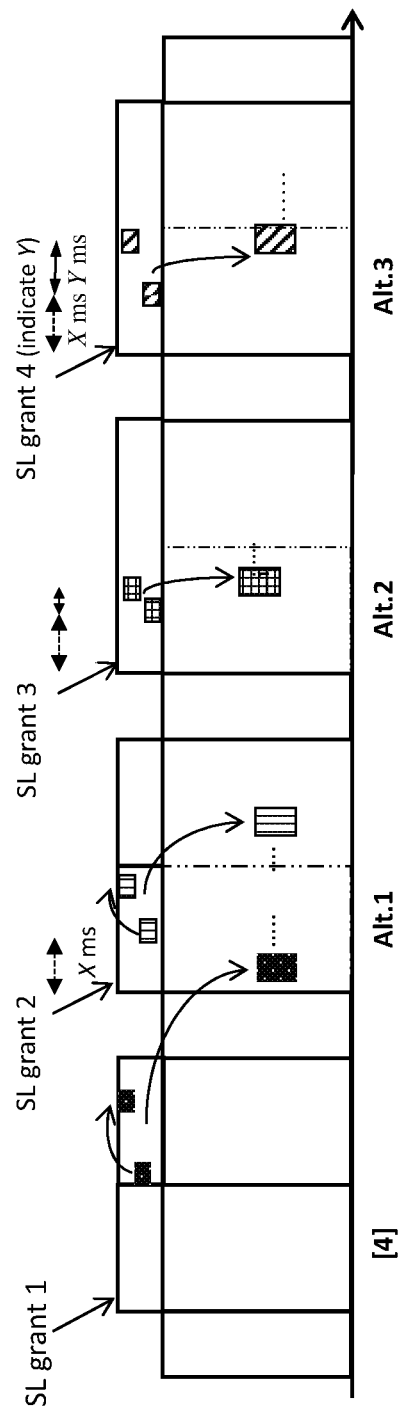
FIG. 10 is a diagram according to one exemplary embodiment.

FIG. 10 illustrates an example of the three alternatives for the timing of the second SA transmission. The first SA transmission upon receiving SL grant 1 follows the constraint of SA pool, and the first SA transmission upon receiving SL grant 2-4 follows fixed timing, X ms. For Alternative 1, the timing of the second SA transmission is derived from a specific formula based on the timing of the first SA transmission, wherein the first SA transmission and the second SA transmission are with the same SA pool. For Alternative 2, the timing occasion of the second SA transmission is the next one subframe after the timing occasion of the first SA transmission. For Alternative 3, the timing occasion of the second SA transmission is the next Y-th subframe after the timing occasion of the first SA transmission, wherein Y is indicated by SL grant 4. For the SA resources multiplexed with data resources in the frequency domain, there is no SA pool division in the time domain of Alternative 2 and Alternative 3.

Figure 11:
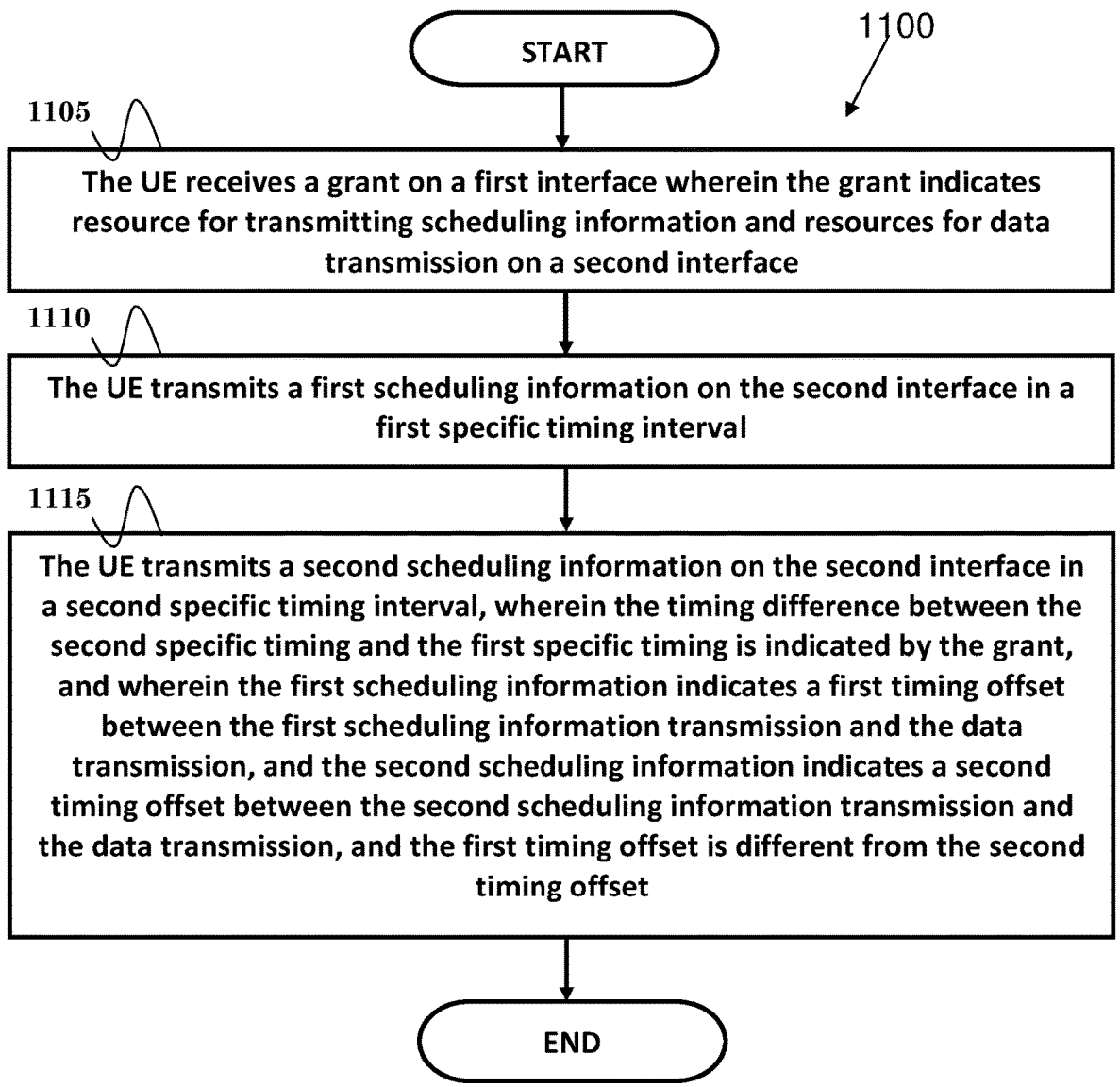
FIG. 11 is a flow chart according to one exemplary embodiment.

FIG. 11 is a flow chart 1100 according to one exemplary embodiment from the perspective of a UE. In step 1105, the UE receives a grant on a first interface wherein the grant indicates resource for transmitting scheduling information and resources for data transmission on a second interface.

In step 1110, the UE transmits a first scheduling information on the second interface in a first specific timing interval. In step 1115, the UE transmits a second scheduling information on the second interface in a second specific timing interval, wherein the timing difference between the second specific timing and the first specific timing is indicated by the grant, and wherein the first scheduling information indicates a first timing offset between the first scheduling information transmission and the data transmission, the second scheduling information indicates a second timing offset between the second scheduling information transmission and the data transmission, and the first timing offset is different from the second timing offset. Furthermore, the UE transmits the data transmission associated with both the first scheduling information and the second scheduling information on the second interface.

Referring back to FIGS. 3 and 4, in one exemplary embodiment of a UE, the device 300 includes a program code 312 stored in the memory 310 program code 312. The CPU 308 could execute program code 312 to enable the UE (i) to receive a grant on a first interface wherein the grant indicates resource for transmitting scheduling information and resources for data transmission on a second interface, (ii) to transmit a first scheduling information on the second interface in a first specific timing interval, and (iii) to transmit a second scheduling information on the second interface in a second specific timing interval, wherein the timing difference between the second specific timing and the first specific timing is indicated by the grant, and wherein the first scheduling information indicates a first timing offset between the first scheduling information transmission and the data transmission, and the second scheduling information indicates a second timing offset between the second scheduling information transmission and the data transmission, and the first timing offset is different from the second timing offset. Furthermore, the CPU 308 can execute the program code 312 to perform all of the above-described actions and steps or others described herein.

Figure 12:
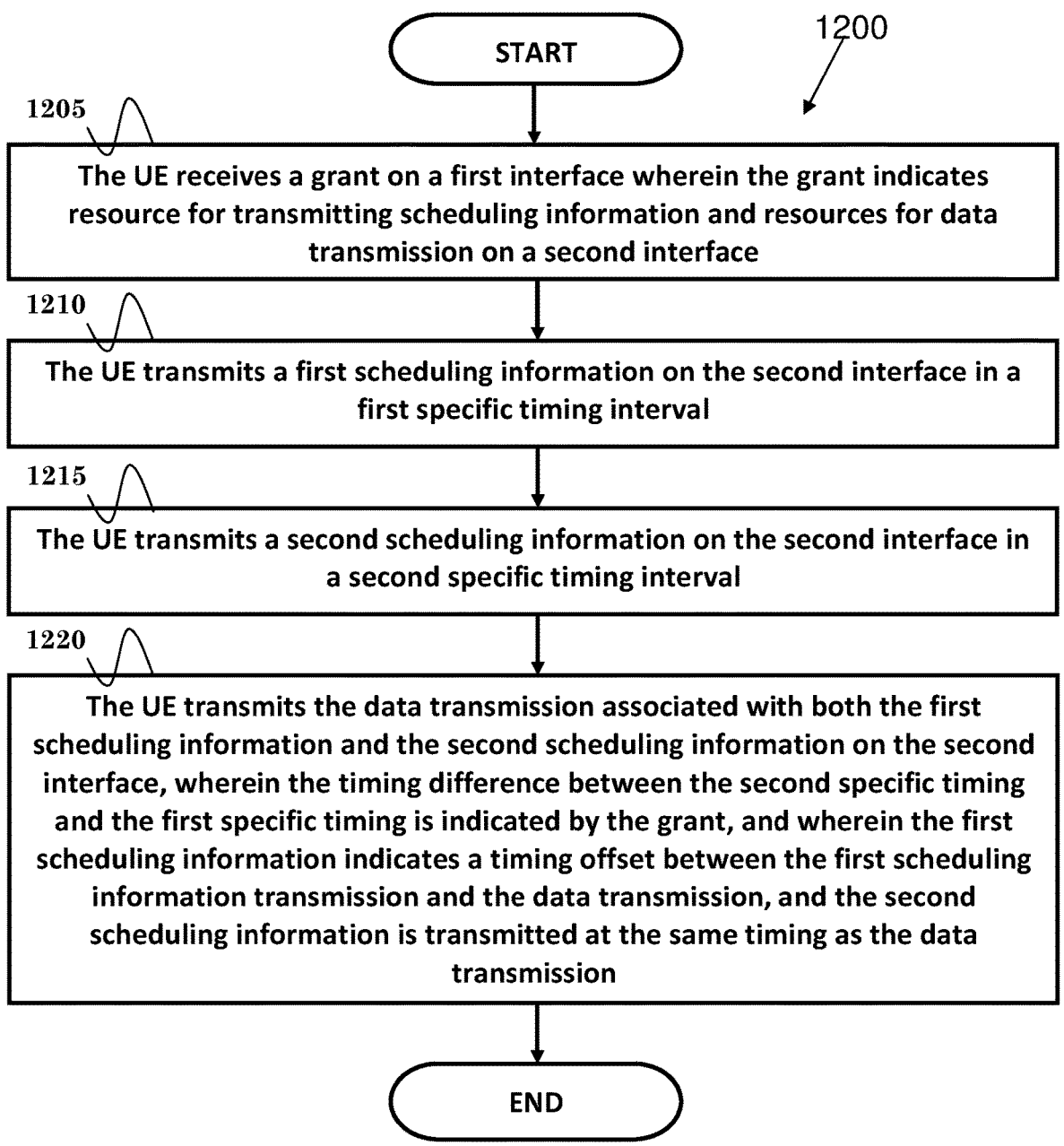
FIG. 12 is a flow chart according to one exemplary embodiment.

FIG. 12 is a flow chart 1200 according to one exemplary embodiment from the perspective of a UE. In step 1205, the UE receives a grant on a first interface wherein the grant indicates resource for transmitting scheduling information and resources for data transmission on a second interface.

In step 1210, the UE transmits a first scheduling information on the second interface in a first specific timing interval. In step 1215, the UE transmits a second scheduling information on the second interface in a second specific timing interval. In step 1220, the UE transmits the data transmission associated with both the first scheduling information and the second scheduling information on the second interface, wherein the timing difference between the second specific timing and the first specific timing is indicated by the grant, and wherein the first scheduling information indicates a timing offset between the first scheduling information transmission and the data transmission, and the second scheduling information is transmitted at the same timing as the data transmission.

Referring back to FIGS. 3 and 4, in one exemplary embodiment of a UE, the device 300 includes a program code 312 stored in the memory 310 program code 312. The CPU 308 could execute program code 312 to enable the UE (i) to receive a grant on a first interface wherein the grant indicates resource for transmitting scheduling information and resources for data transmission on a second interface, (ii) to transmit a first scheduling information on the second interface in a first specific timing interval, (iii) to transmit a second scheduling information on the second interface in a second specific timing interval, and (iv) to transmit the data transmission associated with both the first scheduling information and the second scheduling information on the second interface, wherein the timing difference between the second specific timing and the first specific timing is indicated by the grant, and wherein the first scheduling information indicates a timing offset between the first scheduling information transmission and the data transmission, and the second scheduling information is transmitted at the same timing as the data transmission. Furthermore, the CPU 308 can execute the program code 312 to perform all of the above-described actions and steps or others described herein.

In one embodiment, the first interface could be a Uu interface or a PC5 interface. In addition, the second interface could be a Uu interface or a PC5 interface. Furthermore, resources for transmission of scheduling information and resources for data transmission could be FDM (Frequency Division Multiplex). Resources for transmission of scheduling information could be multiplexed with resources for data transmission in frequency domain.

In one embodiment, the second timing offset could be zero. Furthermore, the first specific timing interval occurs at a fixed timing difference after the timing of receiving the grant, and the fixed timing difference is specified or configured. Alternatively, the fixed timing difference could be 4 TTIs (Transmission Time Intervals).

In one embodiment, resources available for the transmission of the scheduling information are divided into multiple resource pools in a time domain. Furthermore, the scheduling information in the first specific timing interval and scheduling information transmitted in a second specific timing interval are associated with a same resource pool in the time domain.

In an alternative embodiment, resources available for the transmission of the scheduling information are not divided into multiple resource pools in a time domain at least for deriving the first specific timing interval and the second specific timing interval. Furthermore, the grant could indicate a timing difference between the second specific timing interval and the first specific timing interval.

In one embodiment, resources available for the transmission of the scheduling information are divided into at least two resource parts in a frequency domain. Furthermore, the transmission of the scheduling information in the first specific timing interval is associated with one resource part and the transmission of scheduling information in a second specific timing interval is associated with another resource part. In addition, the transmission of the scheduling information in the first specific timing interval could have different content than the transmission of the scheduling information in the second specific timing interval.

In one embodiment, the first scheduling information could indicate the resources for a data transmission on a second interface, and the second scheduling information could indication the same resources for the data transmission as the first scheduling information. Furthermore, the first scheduling information could have different content than the second scheduling information.

In one embodiment, resources available for data transmission are divided into multiple data resource pools in a time domain. Alternatively, resources available for data transmission are not divided into multiple data resource pools in a time domain.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a UE (User Equipment), comprising:
   the UE receives a grant on a first interface wherein the grant indicates a first resource for transmission of a first scheduling information, a second resource for transmission of a second scheduling information, and a time and frequency resource for a data transmission in a resource pool on a second interface;
   the UE transmits the first scheduling information in the first resource indicated by the grant on the second interface in a first timing interval;
   the UE transmits the second scheduling information in the second resource indicated by the grant on the second interface in a second timing interval; and
   the UE transmits the data transmission in the time and frequency resource indicated by the grant on the second interface in a third timing interval,
   wherein a timing difference between the second timing interval in which the second scheduling information is transmitted in the second resource indicated by the grant and the first timing interval in which the first scheduling information is transmitted in the first resource indicated by the grant is indicated by the grant, wherein the second scheduling information is different than the first scheduling information,
   wherein the first timing interval is a first TTI (Transmission Time Interval),
   wherein the second timing interval is a second TTI, and
   wherein the third timing interval is a third TTI.

2. The method of claim 1, wherein at least one of a second timing offset between transmission of the second scheduling information in the second timing interval and transmission of the data transmission in the third timing interval is zero, or a first timing offset between transmission of the first scheduling information in the first timing interval and transmission of the data transmission in the third timing interval is the same as the timing difference.

3. The method of claim 1, wherein the first interface is a Uu interface and the second interface is a PC5 interface.

4. The method of claim 1, wherein the second resource for transmission of the second scheduling information is multiplexed with the time and frequency resource for the data transmission in frequency domain.

5. The method of claim 1, at least one of wherein the first scheduling information in the first timing interval and the second scheduling information transmitted in a second timing interval are associated with the same resource pool in time domain, or wherein the transmission of the first scheduling information and the transmission of the second scheduling information are in the same resource pool.

6. The method of claim 1, wherein the first resource for transmission of the first scheduling information and the second resource for the second scheduling information are not divided into multiple resource pools in time domain at least for deriving the first timing interval and the second timing interval.

7. The method of claim 1, wherein the first resource for transmission of the first scheduling information is multiplexed with the time and frequency resource for the data transmission at least in frequency domain.

8. The method of claim 1, wherein the first scheduling information indicates the time and frequency resource for the data transmission on the second interface, and the second scheduling information indicates the same time and frequency resource for the data transmission as the first scheduling information.

9. The method of claim 1, wherein the first scheduling information has different content as the second scheduling information.

10. The method of claim 1, wherein the time and frequency resource for the data transmission is not divided into multiple resource pools in time domain.

11. A method of a UE (User Equipment), comprising:
    the UE receives a grant on a first interface wherein the grant indicates a first resource for transmission of a first scheduling information, a second resource for transmission of a second scheduling information, and a time and frequency resource for a data transmission in a resource pool on a second interface;
    the UE transmits the first scheduling information in the first resource indicated by the grant on the second interface in a first timing interval;
    the UE transmits the second scheduling information in the second resource indicated by the grant on the second interface in a second timing interval; and
    the UE transmits the data transmission in the time and frequency resource indicated by the grant on the second interface,
    wherein a timing difference between the second timing interval in which the second scheduling information is transmitted in the second resource indicated by the grant and the first timing interval in which the first scheduling information is transmitted in the first resource indicated by the grant is indicated by the grant, wherein the second scheduling information is different than the first scheduling information.

12. The method of claim 11, wherein the first interface is a Uu interface and the second interface is a PC5 interface.

13. The method of claim 11, wherein the second resource for transmission of the second scheduling information is multiplexed with the time and frequency resource for the data transmission in frequency domain.

14. The method of claim 11, at least one of wherein the first scheduling information in the first timing interval and the second scheduling information transmitted in a second timing interval are associated with the same resource pool in time domain, or wherein the transmission of the first scheduling information and the transmission of the second scheduling information are in the same resource pool.

15. The method of claim 11, wherein a timing offset between transmission of the first scheduling information in the first timing interval and transmission of the data transmission in the second timing interval is the same as the timing difference.

16. The method of claim 11, wherein the first resource for transmission of the first scheduling information is multiplexed with the time and frequency resource for the data transmission at least in frequency domain.

17. The method of claim 11, wherein the first scheduling information indicates the time and frequency resource for the data transmission on the second interface, and the second scheduling information indicates the same time and frequency resource for the data transmission as the first scheduling information.

18. The method of claim 11, wherein the first scheduling information has different content as the second scheduling information.

19. The method of claim 11, wherein the time and frequency resource for the data transmission is not divided into multiple resource pools in time domain.

20. A UE (User Equipment), comprising:
a control circuit;
a processor installed in the control circuit; and
a memory installed in the control circuit and operatively coupled to the processor;
wherein the processor is configured to execute a program code stored in the memory to:
receive a grant on a first interface wherein the grant indicates a first resource for transmission of a first scheduling information, a second resource for transmission of a second scheduling information, and a time and frequency resource for a data transmission in a resource pool on a second interface;
transmit the first scheduling information in the first resource indicated by the grant on the second interface in a first timing interval;
transmit the second scheduling information in the second resource indicated by the grant on the second interface in a second timing interval; and
transmit the data transmission in the time and frequency resource indicated by the grant on the second interface,
wherein a timing difference between the second timing interval and the first timing interval is indicated by the grant,
wherein the first timing interval is a first TTI (Transmission Time Interval), and
wherein the second timing interval is a second TTI.

* * * * *